(12) United States Patent
Kinomura (10) Patent No.: US 11,749,089 B2
(45) Date of Patent: *Sep. 5, 2023

(54) SERVER, POWER MANAGEMENT SYSTEM, AND POWER MANAGEMENT METHOD

(71) Applicant: TOYOTA JIDOSHA KABUSHIKI KAISHA, Toyota (JP)

(72) Inventor: Shigeki Kinomura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/689,442

(22) Filed: Mar. 8, 2022

(65) Prior Publication Data

US 2022/0292951 A1 Sep. 15, 2022

(30) Foreign Application Priority Data

Mar. 15, 2021 (JP) ................................ 2021-041175

(51) Int. Cl.
*B60L 15/20* (2006.01)
*G07C 5/00* (2006.01)
*B60L 58/12* (2019.01)
*G08B 21/18* (2006.01)
*G07C 9/10* (2020.01)
(Continued)

(52) U.S. Cl.
CPC ............ *G08B 21/182* (2013.01); *B60K 35/00* (2013.01); *G07C 9/10* (2020.01); *B60K 2370/168* (2019.05); *E01F 13/04* (2013.01)

(58) Field of Classification Search
CPC ........ G08B 21/182; G07C 9/10; B60K 35/00; B60K 2370/168; E01F 13/04
See application file for complete search history.

(56) References Cited

U.S. PATENT DOCUMENTS

2010/0102776 A1* 4/2010 Uchida .................. B60K 6/445
320/109
2010/0145568 A1* 6/2010 Watanabe .............. G07C 5/085
701/29.6
2013/0096725 A1 4/2013 Ishida et al.
(Continued)

FOREIGN PATENT DOCUMENTS

JP 2009184636 A * 8/2009
JP 2009-262692 A 11/2009
(Continued)

*Primary Examiner* — Chico A Foxx
(74) *Attorney, Agent, or Firm* — Finnegan, Henderson, Farabow, Garrett & Dunner, LLP (57) ABSTRACT

A green zone exists in which traveling of a vehicle using an amount of electric power that has a greenhouse gas emission intensity greater than a regulatory limit is restricted. A server includes. I/O ports through which the emission intensity of the electric power supplied from an electric vehicle supply equipment is obtained; and a processor that associates the amount of electric power charged from the electric vehicle supply equipment to a battery with the emission intensity obtained through the I/O ports. The processor: determines, based on an amount of electric power having an emission intensity less than the regulatory limit within the amount of electric power stored in the battery, whether a vehicle should be permitted to travel in the green zone; and notifies a user of the vehicle of a determination result.

8 Claims, 8 Drawing Sheets

(51) Int. Cl.
*B60K 35/00* (2006.01)
*E01F 13/04* (2006.01)

(56) References Cited

U.S. PATENT DOCUMENTS

| | | | |
|---|---|---|---|
| 2016/0164313 A1 | 6/2016 | Ohta et al. | |
| 2019/0135070 A1 | 5/2019 | Lee | |
| 2020/0284599 A1* | 9/2020 | Cyr | ................... G01C 21/3469 |

FOREIGN PATENT DOCUMENTS

| | | | | |
|---|---|---|---|---|
| JP | 2010-239704 A | 10/2010 | | |
| JP | 2011-191909 A | 9/2011 | | |
| JP | 2012-016185 A | 1/2012 | | |
| JP | 2013-025432 A | 2/2013 | | |
| JP | 6156499 B2 | 7/2017 | | |
| JP | 2017-178075 A | 10/2017 | | |
| JP | 2019-085094 A | 6/2019 | | |
| JP | 2020-086911 A | 6/2020 | | |
| WO | WO-2007066198 A2 * | 6/2007 | ............ | B60K 6/365 |
| WO | WO 2011/132054 A2 | 10/2011 | | |

* cited by examiner

$E1 < E3 < Ereg < E2 < E4$
AMOUNT OF CLEAN ELECTRIC POWER

SERVER, POWER MANAGEMENT SYSTEM, AND POWER MANAGEMENT METHOD

This nonprovisional application is based on Japanese Patent Application No. 2021-041175 filed on Mar. 15, 2021 with the Japan Patent Office, the entire content of which is hereby incorporated by reference.

BACKGROUND

Field

The present disclosure relates to a server, a power management system, and a power management method, and, more particularly, to a technique for managing electric power information of a vehicle.

Description of the Background Art

The amount of electric power stored in the traction battery of a vehicle include those derived from various power generation modes, such as thermal power generation, nuclear power generation, hydroelectric power generation, solar power generation, etc. A management approach is known for differentiating the amounts of electric power stored in a battery by power generation mode (or by amount of greenhouse gas produced upon generation of power) (e.g., see Japanese Patent Laying-Open No. 2020-86911).

An area may be set by laws and regulations or policies where reduction in emission of the exhaust gas is demanded or emission of the exhaust gas is not permitted. Such an area is called "green zone" or "zero emission vehicle (ZEV) zone" (e.g., see Japanese Patent Laying-Open No. 2019-85094). A technology, called "geofence," is also known, which is a virtual boundary for a specific zone, such as a green zone or a ZEV zone, using GPS (Global Positioning System) and wireless communication technologies.

SUMMARY

At present, it is common that a vehicle is permitted to travel within the green zone if the vehicle travels in an electric vehicle (EV) mode (electric power-consuming traveling, without driving the engine). However, the present inventors have focused on a fact that the following problem can occur in the future.

In the future, electric vehicles and plug-in hybrid vehicles are expected to be widely used. In contrast, a respective country may further raise the set goal for the reduction of greenhouse gas emission. To this end, as a condition for permitting the vehicle to travel within the green zone, the vehicle may be asked how much greenhouse gas the vehicle produces when generating the amount of electric power stored in the battery. As a result, whether the vehicle should be permitted to travel in the green zone cannot be managed just by determining whether the vehicle can travel in the EV mode.

The present disclosure is made in view of the problem above, and an object of the present disclosure is to appropriately manage a vehicle that travels in a zone restricted with respect to the amount of production of greenhouse gas involved in generation of power used by the vehicle.

(1) A server according to a first aspect of the present disclosure manages electric power information of a vehicle. The vehicle includes a power storage device that is charged with electric power supplied from a charging facility. The server includes: an interface that obtains an emission intensity of greenhouse gas of electric power supplied from the charging facility; and a processor that associates an amount of electric power charged from the charging facility to the power storage device with the emission intensity obtained via the interface. The processor: determines, based on an amount of electric power having the emission intensity less than a regulatory limit within an amount of electric power stored in the power storage device, whether to permit the vehicle to travel within a travel restriction zone in which traveling using an amount of electric power having the emission intensity greater than the regulatory limit is restricted; and notifies a user of the vehicle of a determination result.

(2) The processor: notifies the user of the vehicle as being permitted to travel in the travel restriction zone, when the amount of electric power having the emission intensity less than the regulatory limit is greater than a reference amount; and notifies the user of the vehicle as being not permitted to travel in the travel restriction zone, when the amount of electric power having the emission intensity less than the regulatory limit is less than the reference amount.

In the configurations (1) and (2) above, the processor manages the amount of electric power associated with the emission intensity (power coloring), which is charged from the charging facility to the power storage device. This allows the server to know how much electric power (clean electric power) having the emission intensity less than the regulatory limit is within the amount of electric power stored in the power storage device. Thus, according to the configurations (1) and (2) above, the vehicle that travels in the travel restriction zone can be appropriately managed.

(3) Prior to the vehicle entering the travel restriction zone, the processor notifies the user of the determination result.

In the configuration (3) above, prior to the vehicle entering the travel restriction zone, the user is notified of the determination result. This can, for example, prevent a situation in which the user knows that the entry into the travel restriction zone is not permitted immediately before attempting to do so, making the user confused. This also enables the user to take an appropriate action, such as selecting a route bypassing the travel restriction zone.

(4) A power management system according to a second aspect of the present disclosure includes the server and the vehicle. The vehicle includes a display. The display shows the determination result in a manner viewable from inside the vehicle.

(5) The display further shows at least one of the amount of electric power having the emission intensity less than the regulatory limit (an amount of clean electric power) and a distance that the vehicle (1) is allowed to travel using the amount of electric power (an EV range).

In the configurations (4) and (5) above, a result of determination by the server (the vehicle 1 is permitted/not permitted to travel in the green zone) or the conditions of the vehicle related to the amount of clean electric power or the EV range is displayed on the display. Thus, according to the configurations (4) and (5) above, the user of the vehicle is allowed to readily know the determination result or the conditions of the vehicle.

(6) A power management system according to a third aspect of the present disclosure includes the server and the vehicle. The vehicle includes a display. The display shows the determination result in a manner viewable from outside the vehicle.

According to the configuration (6) above, one (such as an administrator of the travel restriction zone) can readily know, from outside the vehicle, whether the vehicle is permitted to enter or travel within the travel restriction zone, and he/she is thereby enabled to take an appropriate action (such as controlling vehicles not permitted to travel in the travel restriction zone).

(7) The power management system further includes a gate disposed at a boundary of the travel restriction zone. As the vehicle approaches the gate, the gate opens or closes depending on the amount of electric power having the emission intensity less than the regulatory limit (an amount of clean electric power).

According to the configuration (7) above, the gate can be kept closed to vehicles that are short of an amount of clean electric power, preventing them to entering the green zone.

(8) A power management method according to a fourth aspect of the present disclosure manages electric power information of a vehicle. The vehicle includes a power storage device that is charged with electric power supplied from a charging facility. The power management method includes a first step, a second step, a third step, and a fourth step. The first step is obtaining the amount of electric power charged from the charging facility to the power storage device. The second step is obtaining an emission intensity of greenhouse gas of the electric power supplied from the charging facility. The third step is associating the amount of electric power charged from the charging facility to the power storage device with the emission intensity. The fourth step is determining, based on an amount of electric power having the emission intensity less than a regulatory limit within an amount of electric power stored in the power storage device, whether to permit the vehicle to travel within a travel restriction zone in which traveling using an amount of electric power having the emission intensity greater than the regulatory limit is restricted, and notifying a user of the vehicle of a determination result.

According to the method (8) above, the vehicle that travels in the travel restriction zone can be appropriately managed, as with the configuration (1) above.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Hereinafter, embodiments of the present disclosure will be now described in detail, with reference to the accompanying drawings. Note that the same reference sign is used to refer to the same or like parts, and the description thereof will not be repeated.

Embodiment

<Overall System Configuration>

Figure 1:
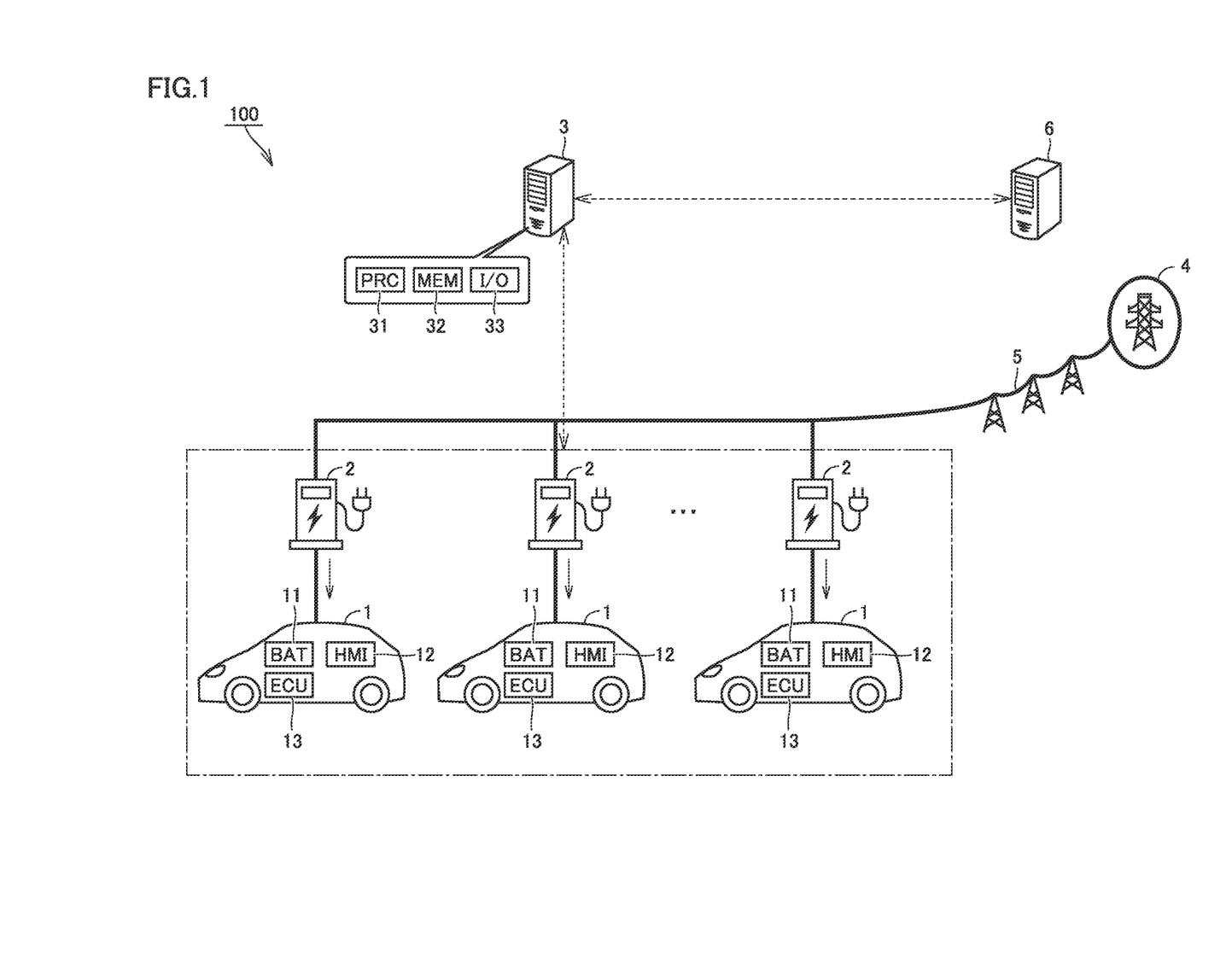
FIG. 1 is a schematic configuration of a power management system according to an embodiment of the present disclosure.

FIG. 1 is a schematic configuration of a power management system according to an embodiment of the present disclosure. A power management system 100 includes a vehicle 1; an electric vehicle supply equipment (EVSE) 2; a server 3; a power system 4; a power transmission line 5; an operator server 6; and a gate (see FIG. 2).

The vehicle 1 is an electric-powered vehicle, and, more specifically, is a battery electric vehicle (BEV), a plug-in hybrid electric vehicle (PHEV), etc. Hereinafter, for simplicity, assume that the vehicle 1 is a BEV. The vehicle 1 includes a battery 11, a human machine interface (HMI) 12, and an electronic control unit (ECU) 13.

The battery 11 is an assembled battery formed of multiple cells (not shown). Each cell is a secondary battery, such as a lithium-ion battery or a nickel-hydrogen battery. The battery 11 supplies an electric power for generating a driving force for the vehicle 1. The battery 11 also stores electric power that is generated by a motor generator (not shown) upon braking through a regenerative braking system of vehicle 1. Note that a capacitor, such as an electric double layer capacitor, can be employed, instead of the battery 11. The battery 11 corresponds to a "power storage device" according to the present disclosure.

The vehicle 1 has a configuration in which electric power supplied from the electric vehicle supply equipment 2 is charged to the battery 11 as a charging cable, extending from the electric vehicle supply equipment 2, is connected to an inlet (not shown) of the vehicle 1. Hereinafter, this mode of charging is also referred to as "external charging."

For example, the HMI 12 receives operations by a user (a driver), or provides the user with various information and data. The configuration of the HMI 12 will be described in more detail, with reference to FIG. 3.

The ECU 13 includes a processor, such as a central processing unit (CPU), a memory, such as a read only memory (ROM) and a random access memory (RAM), and input/output ports. The ECU 13 executes various arithmetic processes for controlling the vehicle 1.

The electric vehicle supply equipment 2 is, for example, a public charging station or a home charger. The electric vehicle supply equipment 2 receives electric power from the power system 4 via the power transmission line 5, and supplies the electric power to the vehicle 1. The electric vehicle supply equipment 2 and the server 3 are also capable of two-way communications therebetween.

The server 3 is a computer which manages the vehicle 1 and the electric vehicle supply equipment 2 within the power management system 100. The server 3 includes a processor 31, a memory 32, and input/output ports 33. The processor 31 is, for example, a central processing unit (CPU), and executes the arithmetic processes written in programs. The memory 32 includes a memory storing the programs for execution by the processor 31, and stores various data (maps, relational expressions, parameters, etc.) that are used in the programs. The memory 32 also includes a database, and stores data related to electric power for the various devices within the power management system 100. The input/output ports 33 receive/output notifications, commands, requests, etc. from/to outside the server 3. The server 3 includes a communication module (not shown), and communicates external to the power management system 100 (such as the operator server 6), in addition to the vehicle 1 and the electric vehicle supply equipment 2.

Examples of main processes performed by the server 3 according to the present embodiment include "green zone management process" and "power coloring process." The green zone management process manages the vehicle 1 when entering the green zone and when traveling within the green zone. The power coloring process colors amounts of electric power stored in the battery 11. These processes will be described in detail later.

The power system 4 is a power network built by power plants and power transmission and distribution equipment (T&D) facilities. In the present embodiment, an electric power company serves as a power generation utility and a power T&D utility. The electric power company corresponds to a general power T&D utility and an administrator of the power system 4, and maintains and manages the power system 4.

The operator server 6 belongs to the power company. The operator server 6 is a computer which manages the demand and supply of electric power supplied from the power system 4. The operator server 6 has data as to how much greenhouse gas is produced at the power plant (the emission intensity) The operator server 6 is also capable of two-way communications with the server 3.

Note that the number of vehicles 1 and the electric vehicle supply equipment 2 included in the power management system 100 is not particularly limited. The example shown in FIG. 1 show multiple vehicles 1 and multiple electric vehicle supply equipment. However, only one vehicle 1 and one electric vehicle supply equipment 2 may be included.

<Green Zone>

Figure 2:
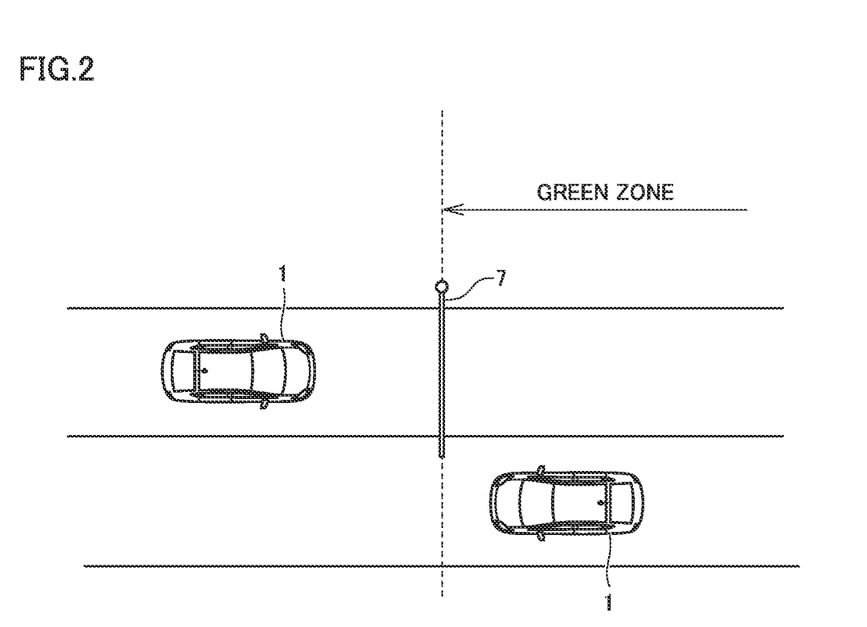
FIG. 2 is a diagram for illustrating one example of how a vehicle enters or leaves a green zone.

FIG. 2 is a diagram for illustrating one example of how the vehicle 1 enters or leaves a green zone. Since emission of the exhaust gas is not permitted within the green zone, the vehicle 1 is requested to travel in the EV mode within the green zone. Note that the green zone corresponds to a "travel restriction zone" according to the present disclosure.

In the example shown in FIG. 2, a gate 7 is provided at the boundary between inner side and outer side of the green zone. As the vehicle 1 approaches the gate 7, the server 3 determines whether to permit the vehicle 1 to enter the green zone. If the vehicle 1 meets a predetermined condition (described later), the server 3 permits the vehicle 1 to enter the green zone, and opens the gate 7. In contrast, if the vehicle 1 fails to meet the condition above, the server 3 does not permit the vehicle 1 to enter the green zone, keeping the gate 7 closed.

However, the gate 7 provided at the boundary is merely by way of example for clarity. A geofence (a virtual boundary) may be set, instead of a physical gate. If the geofence is set, a vehicle failing to meet the condition above may be subjected to penalty (e.g., a fine) if the vehicle enters the green zone.

Figure 3:
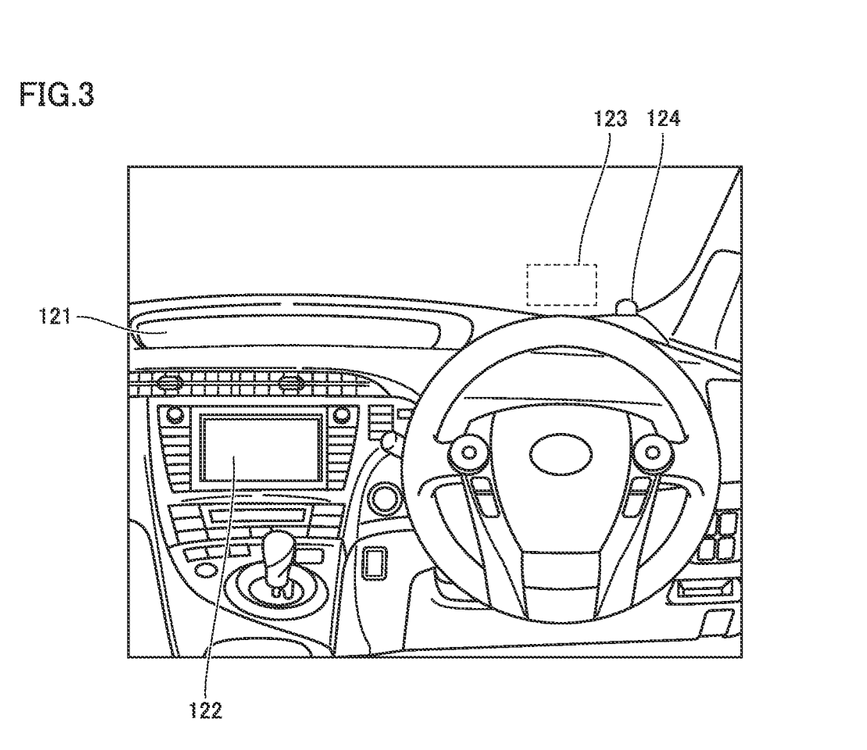
FIG. 3 is a diagram showing a configuration example of a human machine interface (HMI).

FIG. 3 is a diagram showing a configuration example of the HMI 12. In the present embodiment, the HMI 12 shows information for use by the vehicle 1 to travel in the green zone. In the following, the information will also be referred to as "green zone information." More specifically, the green zone information contains information as to whether the vehicle 1 should be permitted or not permitted to enter or travel within the green zone. The HMI 12 includes an instrument panel 121, a head-up display (HUD) 122, a navigation screen 123, and an indicator lamp 124.

The instrument panel 121 is a dashboard in which meters are installed, and displays various states of vehicle 1, according to control by the ECU 13. The instrument panel 121 displays the speedometer, the tripmeter, the SOC of the battery 11, idiot lights, etc., and also displays the green zone information. Note that a multi-information display (MID) can be employed, instead of the instrument panel 121.

The HUD 122 projects various pieces of information in front of the driver's field of view as a virtual image. Specifically, the HUD 122 displays the vehicle speed of the vehicle 1, the direction of travel to the destination, traffic signs, etc. The green zone information may be displayed on the HUD 122.

The navigation screen 123 is a display of a navigation system (not shown). The navigation system includes a GPS receiver for locating the vehicle 1 based on a radio wave from an artificial satellite (not shown). The navigation system displays, on the navigation screen 123, the current location of vehicle 1 and a recommended route to the destination of vehicle 1, based on GPS data of the vehicle 1 and road map data. The navigation screen 123 may be a touch screen monitor (not shown). The green zone information can be displayed also on the navigation screen 123.

In this example, the indicator lamp 124 is disposed on the dashboard. The indicator lamp 124 may be disposed at a different location, such as at the rear-view mirror, a side-view mirror, or the like. The indicator lamp 124 is switchable between two or more lighting colors. As one example, the indicator lamp 124 showing green light indicates that the vehicle 1 is permitted to travel within the green zone (permitted to enter the green zone). The indicator lamp 124 showing red light, on the other hand, indicates that the vehicle 1 is not permitted to travel within the green zone (not permitted to enter the green zone). The green zone information described above may be represented by the indicator lamp 124 being turned on/off.

The instrument panel 121, the HUD 122, and the navigation screen 123 are basically viewable from inside the vehicle 1 (inside the vehicle compartment). In contrast, the indicator lamp 124 is disposed at a location viewable from both inside and outside the vehicle 1. Accordingly, a person other than the user of the vehicle 1 (an administrator of the green zone described later) can also visually recognize the indicator lamp 124 to confirm the green zone information of the vehicle 1.

At least one of the instrument panel 121, the HUD 122, the navigation screen 123, and the indicator lamp 124 of the vehicle 1 corresponds to a "display" according to the present disclosure. For ease of description, an example will be described below in which the green zone information is shown on the instrument panel 121. However, a device on which the green zone information is displayed is not limited to one mounted on the vehicle 1, and may be a user's mobile phone (smartphone, etc.). In other words, "notify a user of the vehicle 1" can include notifying a user's mobile terminal.

<Reduction of Greenhouse Gas Emission>

If electric power generated by burning a fossil fuel is charged to the battery 11, no greenhouse gas is produced while the vehicle 1 is traveling in the EV mode. However, a certain level of greenhouse gas is produced when considering through the course from the generation of electric power to the consumption thereof. Accordingly, just requesting the vehicle 1 to travel in the EV mode within the green zone does not contribute to reduction of greenhouse gas emission, which may result in failing to achieve a high goal for the reduction of greenhouse gas emission.

Thus, in the present embodiment, how much greenhouse gas is produced when the amount of electric power stored in the battery 11 is generated is considered as a condition for permitting the vehicle 1 to enter or travel within the green zone. More specifically, "emission intensity" (unit: g/kWh) which is greenhouse gas emission per unit of generated power is taken into account.

During the external charging of the vehicle 1, the server 3 obtains data related to the emission intensity from the power company, and associates the amount of electric power stored in the battery 11 with the emission intensity. Stated differently, the server 3 performs "power coloring process," in which the amount of electric power stored in the battery 11 is conceptually colored in accordance with the emission intensity. This enables the server 3 to quantitatively evaluate the amount of electric power stored in the battery 11 based on whether an amount of electric power is clean or not.

The server 3 permits the vehicle 1 to travel in the green zone, consuming the amount of clean electric power having an emission intensity less than the regulatory limit (described as Ereg). Hereinafter, for simplicity, this amount of electric power will also be referred to as an "amount of clean electric power." If the amount of clean electric power of the vehicle 1 is greater than a predetermined reference amount Pref, the server 3 permits the vehicle 1 to enter and travel in the green zone. If the amount of clean electric power is less than or equal to the reference amount Pref, in contrast, the server 3 does not permit the vehicle 1 to enter the green zone. Even after the vehicle 1 has entered the green zone, the server 3 does not permit the vehicle 1 to travel within the green zone any further if the amount of clean electric power is consumed and depleted along with the vehicle 1 traveling within the green zone. This process will be described in detail later.

<Power Coloring>

Figure 4:
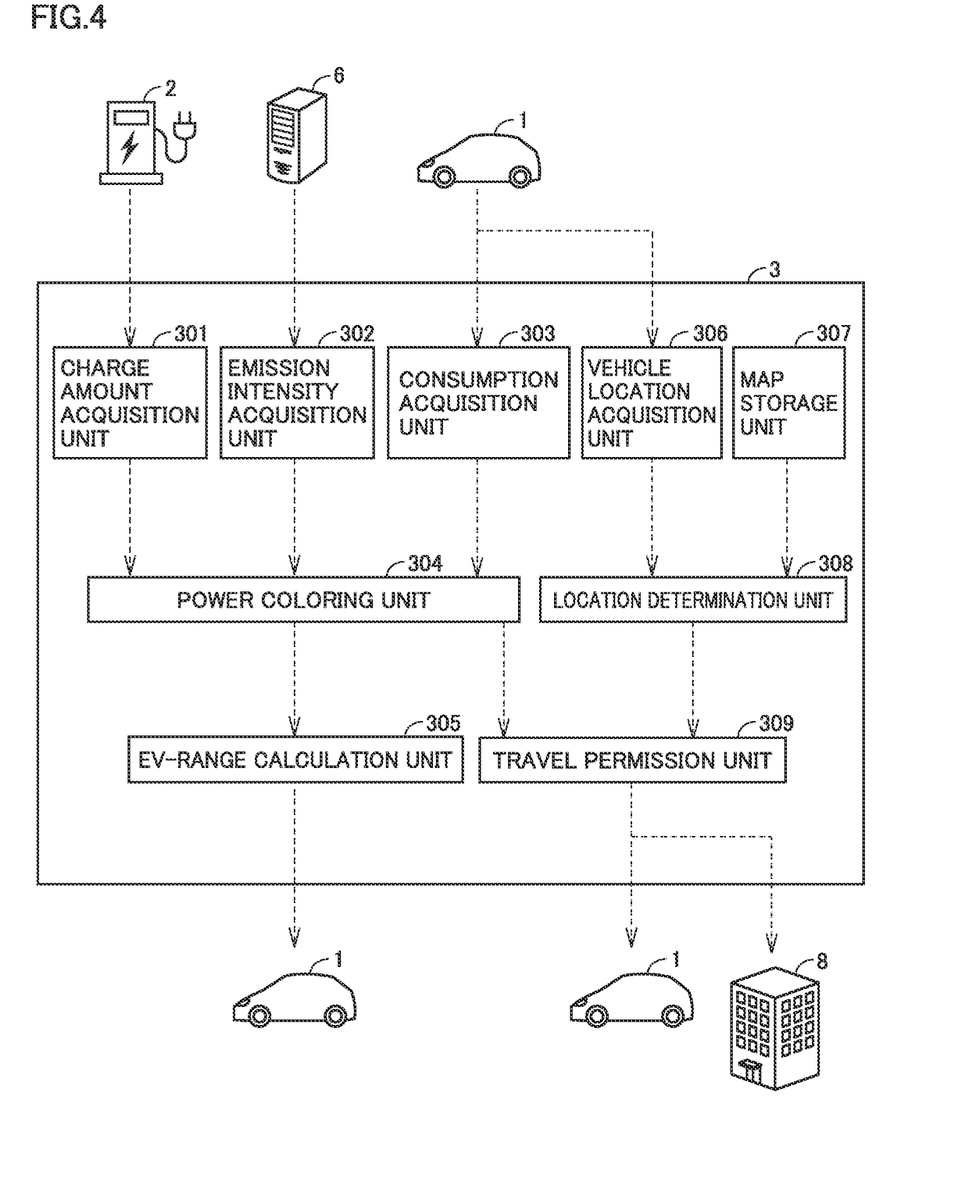
FIG. 4 is a functional block diagram of a server.

FIG. 4 is a functional block diagram of the server 3. The server 3 includes a charge amount acquisition unit 301, an emission intensity acquisition unit 302, a consumption acquisition unit 303, a power coloring unit 304, an EV-range calculation unit 305, a vehicle location acquisition unit 306, a map storage unit 307, a location determination unit 308, and a travel permission unit 309.

During the external charging of the vehicle 1, the charge amount acquisition unit 301 obtains the amount of electric power that is supplied from the electric vehicle supply equipment 2 to the vehicle 1 and charged to the battery 11. While the charge amount acquisition unit 301 can obtain the amount of electric power charged to the battery 11, through communications with the electric vehicle supply equipment 2, the charge amount acquisition unit 301 may obtain this from the vehicle 1. The obtained amount of electric power is output to the power coloring unit 304.

The emission intensity acquisition unit 302 obtains from the power company the emission intensity of the amount of electric power supplied from the electric vehicle supply equipment 2 to the vehicle 1.

Figure 5:
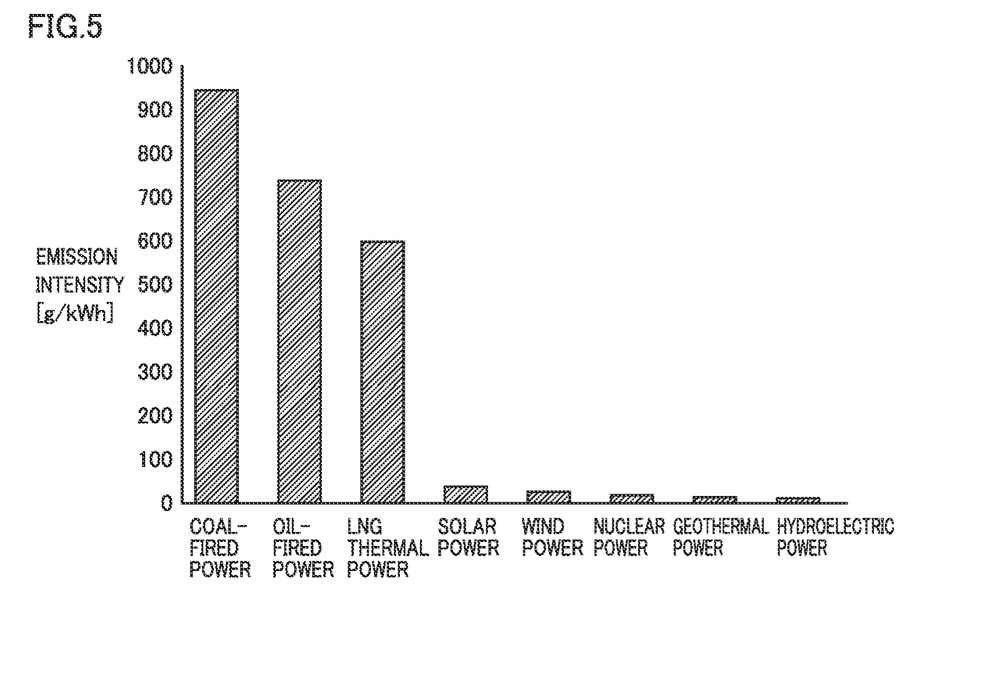
FIG. 5 is a diagram for illustrating emission intensity.

FIG. 5 is a diagram for illustrating the emission intensity. FIG. 5 shows representative emission intensities of thermal power generation, solar power generation, wind power generation, nuclear power generation, geothermal power generation, and hydroelectric power generation. One can see, from FIG. 5, that thermal power generation (coal-fired power generation, oil-fired power generation, and liquefied natural gas (LNG) thermal power generation) have greater emission intensities than the other power generation modes.

Returning to FIG. 4, regarding the electric power transmitted from the power system 4 to the electric vehicle supply equipment 2 via the power transmission line 5, the operator server 6 of the power company has the data related to the emission intensity of that electric power when generated. Accordingly, the emission intensity acquisition unit 302 can obtain from the operator server 6 the emission intensity of the amount of electric power supplied from the electric vehicle supply equipment 2 to the vehicle 1. The obtained emission intensity is output to the power coloring unit 304.

The consumption acquisition unit 303 obtains from the vehicle 1 the amount of electric power consumed (used) from the battery 11 while the vehicle 1 is traveling. The obtained amount of electric power is output to the power coloring unit 304.

Based on the amount of electric power charged to the battery 11 and the amount of electric power consumed from the battery 11, the power coloring unit 304 performs the power coloring process on the amount of electric power stored in the battery 11.

Figure 6:
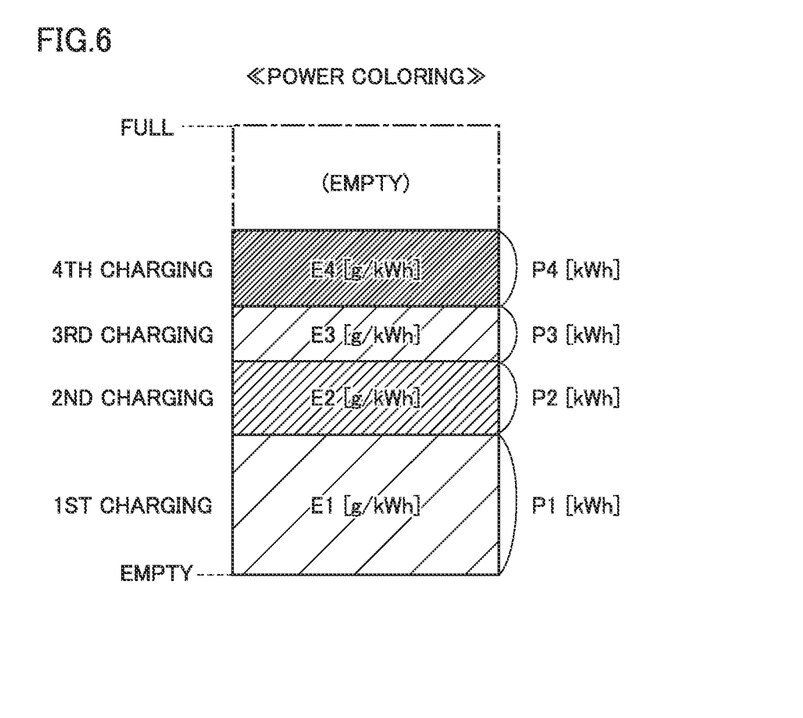
FIG. 6 is a conceptual diagram of a power coloring process.

FIG. 6 is a conceptual diagram of the power coloring process. The server 3 associates the amount of electric power charged to the battery 11 with its emission intensity when that electric power is generated. In the present embodiment, the server 3 distinctly manages the association between the amount of electric power charged to the battery 11 and the emission intensity for each external charging opportunity.

FIG. 6 illustrates a result of the power coloring process when external charging is performed four times. For the first charging opportunity, the server 3 associates an amount of electric power P1 charged to the battery 11 with an emission intensity E1. For the second charging opportunity, the server 3 associates an amount of electric power P2 charged to the battery 11 with an emission intensity E2. The same applies to the third charging opportunity and the fourth charging opportunity.

Figure 7:
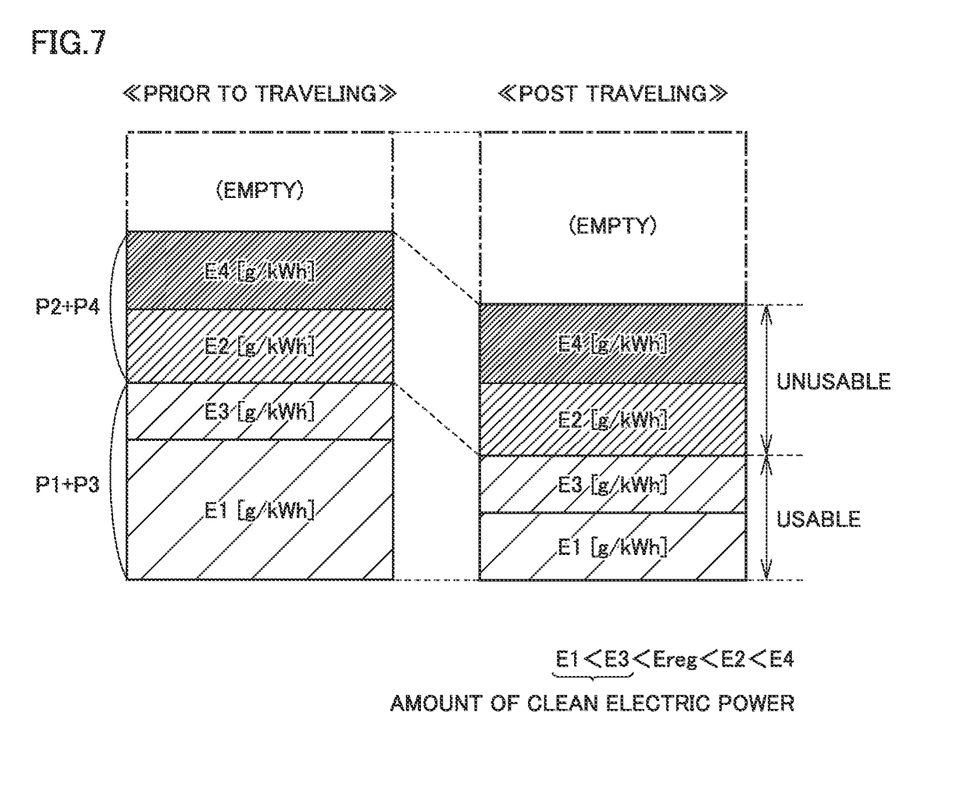
FIG. 7 is a conceptual diagram for illustrating a power coloring process according to the present embodiment.

FIG. 7 is a conceptual diagram for illustrating the power coloring process according to the present embodiment. In this example, the four charging opportunities, which are the first charging opportunity, the third charging opportunity, the second charging opportunity, the fourth charging opportunity, are listed in order starting from the smallest emission intensity to the largest emission intensity (E1<E3<E2<E4). A regulatory limit Ereg for the emission intensity at which the vehicle 1 is permitted to travel within a green zone is defined by laws and regulations or policies. Among the emission intensities E1 to E4 at the four charging opportunities, the emission intensities E1 and E3 at the first and third charging opportunities are less than the regulatory limit Ereg. Therefore, the amounts of electric powers P1 and P3 charged at the first and third charging opportunities are amounts of clean electric power. In contrast, the emission intensities E2 and E4 at the second and fourth charging opportunities are greater than the regulatory limit Ereg (E1<E3<Ereg<E2<E4). The amounts of electric power P2 and P4 charged at the second and fourth charging opportunities are not amounts of clean electric power.

The server 3 regards that the amounts of clean electric power charged to the battery 11 at the first and third charging opportunities are to be consumed if the vehicle 1 stays within the green zone. Accordingly, comparing before and after the vehicle 1 travels in the green zone, the amounts of clean electric power (P1+P3) charged to the battery 11 at the first and third charging opportunities are used and decrease, as shown in FIG. 7. The amounts of electric power (P2+P4) charged to the battery 11 at the second and fourth charging opportunities remain unused.

If the amounts of clean electric power (P1+P3) charged to the battery 11 at the first and third charging opportunities are greater than a reference amount Pref, the server 3 (the travel permission unit 309) permits the vehicle 1 to enter or travel within the green zone. In contrast, if the amounts of clean electric power (P1+P3) are less than or equal to the reference amount Pref, the server 3 does not permit (disallows) the entry of the vehicle 1 into the green zone.

Even though the amounts of clean electric power (P1+P3) are greater than the reference amount Pref at the time the vehicle 1 enters the green zone, if the amounts of clean electric power (P1+P3) are less than or equal to the reference amount Pref while the vehicle 1 is traveling within the green zone, the server 3 requests the vehicle 1 to promptly leave the green zone.

Referring, again, to FIG. 4, the EV-range calculation unit 305 calculates a distance (an EV range) the vehicle 1 can travel in the EV mode within the green zone. More specifically, as the EV range, the EV-range calculation unit 305 can calculate a distance that the vehicle 1 can travel, consuming the amounts of clean electric power (P1+P3 in the examples of FIGS. 6 and 7) within the amount of electric power stored in the battery 11. The power consumption efficiency of the vehicle 1 (a distance the vehicle 1 can travel per unit amount of electric power (unit: km/kWh), or an amount of electric power the vehicle 1 consumes to travel a unit distance (unit: kWh/km)) can be used for the calculation of the EV range. The power consumption efficiency of the vehicle 1 may be the actual value of the vehicle 1, or a catalogue value for the vehicle type of the vehicle 1.

The vehicle 1 is notified of the EV range calculated by the EV-range calculation unit 305 by a communication module (not shown), and the EV range is displayed on the HMI 12.

Alternative to or in addition to the EV range, if the EV range is longer than the reference range (if the amount of clean electric power is greater than the reference amount Pref), a message "traveling in green zone; OK" may be displayed on the HMI 12. In contrast, if the EV range is less than or equal to the reference range (if the amount of clean electric power is less than or equal to the reference amount Pref), a message "traveling in green zone; NG" may be displayed on the HMI 12. This allows the user of the vehicle outside the green zone to previously know whether the entry of the vehicle 1 into the green zone is to be permitted. The user is also allowed to know how far the vehicle 1 can travel within the green zone. If the vehicle 1 already stays in the green zone, the user is allowed to know a remaining distance the vehicle 1 can travel within the green zone.

The vehicle location acquisition unit 306 obtains the location information (GPS the information) of the vehicle 1 from the vehicle 1. The obtained location information is output to the location determination unit 308.

The map storage unit 307 stores map information on a geographical region covered by the power management system 100. The geographical region covers at least one green zone. The map information is output to the location determination unit 308.

The location determination unit 308 compares the location information of the vehicle 1 with the map information, thereby determining whether the vehicle 1 is located inside or outside the green zone. The location determination unit 308 may also calculate a distance from the vehicle 1 to the boundary of the green zone, and determine that the vehicle 1 is approaching the green zone if the distance is below a predetermined value. A result of the determination by the location determination unit 308 is output to the travel permission unit 309.

When the vehicle 1 approaches the green zone or while the vehicle 1 is traveling within the green zone, the travel permission unit 309 determines whether to permit or not permit the vehicle 1 to travel (or continue to travel) within the green zone, based on a result of the power coloring process. Since this determination approach has been described with respect to FIGS. 6 and 7, the description will not be repeated. The vehicle 1 is notified of whether the vehicle 1 is permitted/not permitted to travel within the green zone.

Preferably, the administrator (regulatory body) 8 of the green zone is also notified of whether the vehicle 1 is permitted/not permitted to travel in the green zone, together with the identification information (e.g., the number on the number plate) of the vehicle 1. This allows the administrator to visually recognize the indicator lamp 124 and then crack down on or penalize the user of the vehicle 1 if the vehicle 1 is traveling within the green zone although the vehicle 1 is not permitted to do so.

<Electric Power Management Flow>

Figure 8:
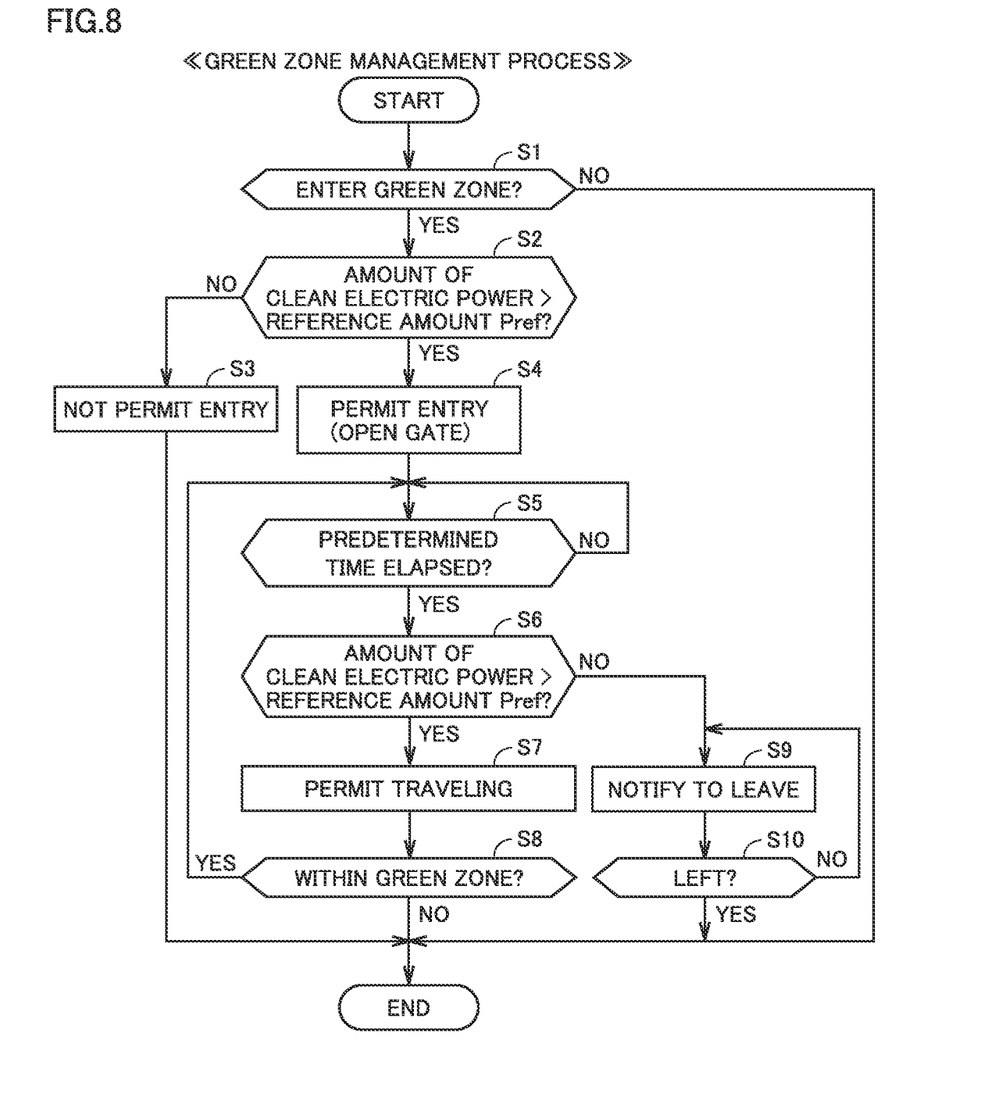
FIG. 8 is a flowchart illustrating a green zone management process.

FIG. 8 is a flowchart illustrating the green zone management process. The green zone management process is performed each time predetermined conditions are met or each time a predetermined time period elapses. Each process step described in FIG. 8 and the flowchart of FIG. 9 described later is implemented by software processing by the server 3. However, each process step may be implemented by hardware (an electric circuit) disposed in the server 3. Hereinafter, each process step is abbreviated as S. For ease of understanding, assume that the vehicle 1 is outside the green zone at the start of the process.

In S1, based on the location information of the vehicle 1 and the map information, the server 3 determines whether the vehicle 1 is approaching the green zone. If the vehicle 1 is distant from the green zone (NO in S1), the subsequent processes are skipped. If the vehicle 1 approaches the green zone (YES in S1), the server 3 passes the process to S2.

In S2, the server 3 determines whether the amount of electric power stored in the battery 11 includes the amount of clean electric power, having an emission intensity less than or equal to the regulatory limit Ereg, is greater than a predetermined reference amount Pref. The amount of clean electric power is calculated by the power coloring process described later. A most comprehensible example of the reference amount Pref is zero. However, the reference amount Pref may be a value greater than zero. The value can be determined based on, for example, the amount of electric power that is consumed by a typical vehicle when traveling a predetermined distance in the EV mode. If the amount of clean electric power is less than or equal to the reference amount Pref (NO in S2), the server 3 does not permit the entry of the vehicle 1 to the green zone (S3). In contrast, if the amount of clean electric power is greater than the reference amount Pref (YES in S2), the server 3 permits the entry of the vehicle 1 to the green zone (S4). Assume that this results in the vehicle 1 having entered the green zone.

In S5, the server 3 determines whether a predetermine time (e.g., a few seconds to a few minutes) has elapsed since the previous execution of the process steps of S5 to S8. If the predetermine time has elapsed (YES in S5), the server 3 passes the process to S6.

In S6, the server 3 determines whether the amount of electric power stored in the battery 11 includes an amount of clean electric power greater than the reference amount Pref.

The reference amount Pref presented in the process step of S2 and the reference amount Pref presented in the process step of S6 may be the same, or different values may be set. More specifically, since the amount of clean electric power gradually decreases as the vehicle 1 travels, if the amount of clean electric power is not sufficient at a moment the vehicle 1 enters the green zone, the amount of clean electric power is highly likely to be depleted while the vehicle 1 is staying in the green zone. Accordingly, the reference amount Pref presented in the process step of S2 may be a value within a certain margin relative to the reference amount Pref in the process step of S6.

If the amount of clean electric power is greater than the reference amount Pref (YES in S6), the server 3 permits the vehicle 1 to travel within the green zone (S7). Then, the server 3 determines whether the vehicle 1 is still staying within the green zone (S8). If the vehicle 1 is staying in the green zone (YES in S8), the server 3 returns the process to S5. This repeats the process steps of S5 to S8 while the vehicle 1 is staying within the green zone. If the vehicle 1 leaves the green zone (NO in S8), the server 3 ends the series of process steps.

In S6, if the amount of clean electric power is less than or equal to the reference amount Pref (NO in S6), the server 3 notifies the vehicle 1 that the vehicle 1 should leave the green zone (S9). The server 3 may send the vehicle 1 a warning prompting the vehicle 1 to leave the green zone. If the vehicle 1 having received a notice or a warning does not leave the green zone promptly (NO in S10), the server 3 may repeat a notice or a warning.

Although not shown, if a prescribed period of time (e.g., a few hours) has elapsed, without the vehicle 1 leaving the green zone, the server 3 may transmit the identification information and the location information of the vehicle 1 to the administrator 8 of the green zone. This allows the administrator 8 to identify the vehicle 1 and strongly warn or impose a penalty, such as a fine, on the user of the vehicle 1. If the vehicle 1 leaves the green zone (YES in S10), the server 3 ends the series of process steps.

Figure 9:
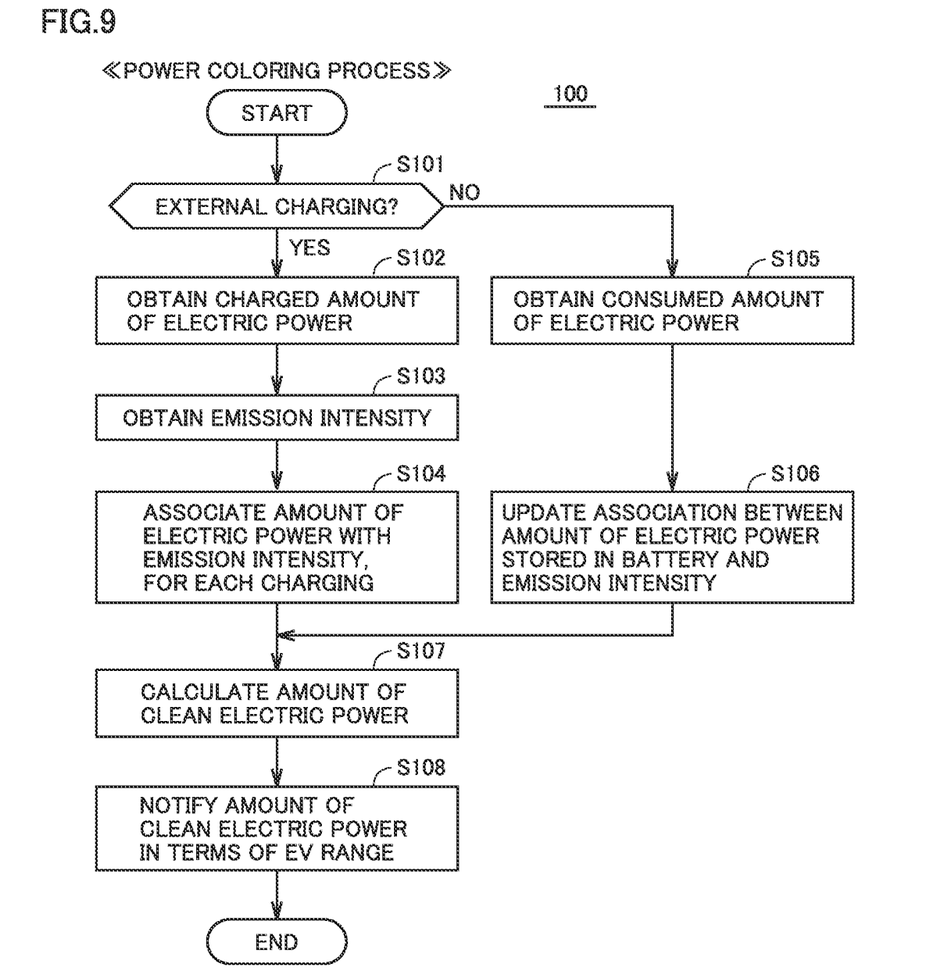
FIG. 9 is a flowchart showing one example of the power coloring process.

FIG. 9 is a flowchart illustrating one example of the power coloring process according to Embodiment 1. The power coloring process is repeatedly performed at predetermined intervals.

In S101, the server 3 determines whether the vehicle 1 has performed external charging at the electric vehicle supply equipment 2. If the vehicle 1 has performed external charging (YES in S101), the server 3 obtains the amount of electric power charged from the electric vehicle supply equipment 2 to the vehicle 1, through communications with the electric vehicle supply equipment 2 (or the vehicle 1) (S102). Regarding the amount of electric power supplied from the power system 4 to the electric vehicle supply equipment 2, the server 3 further obtains, through communications with the operator server 6, the data related to the emission intensity of that amount of electric power when generated (S103).

In S104, the server 3 associates the amount of electric power obtained in S101 and the emission intensity obtained in S102 for each external charging opportunity of the vehicle 1, and stores the association into the memory 32. This allows the server 3 to distinctly manage the association between the amount of electric power charged to the battery 11 and the emission intensity for each external charging opportunity.

In contrast, if the vehicle 1 does not perform external charging (NO in S101), that is, if the vehicle 1 is in a condition in which the amount of electric power stored in the battery 11 is being consumed, such as a condition in which the vehicle 1 is traveling, the server 3 obtains from the vehicle 1 the amount of electric power consumed from the amount of electric power stored in the battery 11 (S105).

In S106, according to a predetermined computation approach, the server 3 subtracts the amount of electric power obtained in S105 from the amount of electric power stored in the battery 11, thereby updating the association between the amount of electric power stored in the battery 11 and the emission intensity. This computation approach is not particularly limited. Various approaches can be adopted. For example, in the example shown in FIG. 7, the consumed amount of electric power is withdrawn from P3 having a greater emission intensity among the amounts of clean electric power (P1+P3) before the vehicle 1 travels in the green zone. However, the consumed amount of electric power may be withdrawn from P3 having a less emission intensity. Alternatively, the consumed amount of electric power may be withdrawn from the amount of clean electric power (P1+P3) while keeping the ratio of P1 to P3. After the execution of the process step S104 or S106, the process proceeds to S107.

In S107, the server 3 calculates the most-recent value of the amount of clean electric power within the amount of electric power stored in the battery 11. Then, the server 3 notifies the vehicle 1 of the most-recent value of the amount of clean electric power in terms of EV range of the vehicle 1 (S108). However, the server 3 may notify the vehicle 1 of the amount of clean electric power as is.

Figure 10:
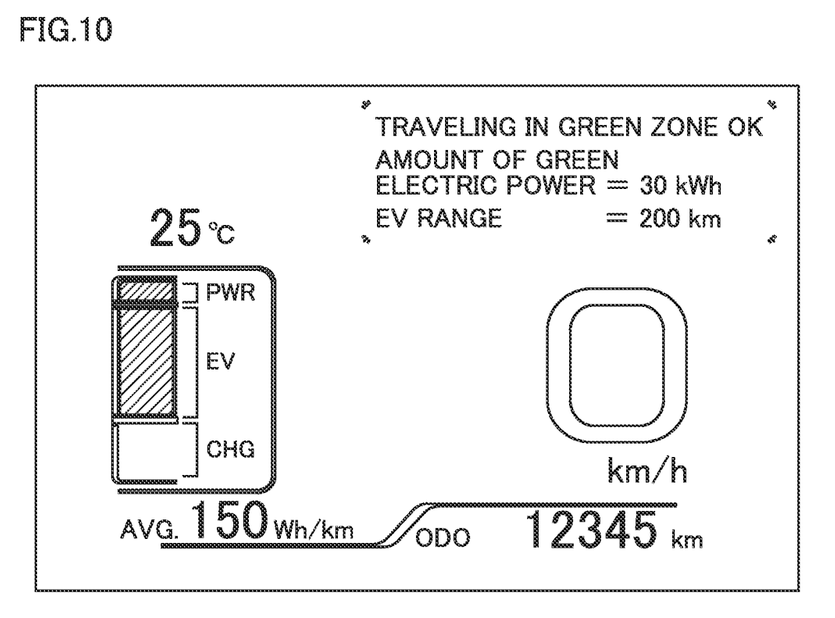
FIG. 10 is a diagram showing one example of green zone information displayed on the HMI (an instrument panel) of a notified vehicle.

FIG. 10 is a diagram showing one example of the green zone information displayed on the HMI 12 (the instrument panel 121) of the vehicle 1 having received a notification. As shown in FIG. 10, the information as to whether the vehicle 1 is permitted to travel in the green zone (or enter the green zone), an amount of electric power that the vehicle 1 can use to travel in the green zone (an amount of green electric power), and an EV range that the vehicle 1 can travel in the green zone can be displayed on the instrument panel 121. However, the green zone information displayed on the instrument panel 121 may contain any one or two of these three information items.

As described above, in the present embodiment, the server 3 performs the power coloring process on the amount of electric power stored in the battery 11, and associates the amount of electric power stored in the battery 11 with emission intensities. This allows the server 3 to know how much clean electric power is included in the amount of electric power stored in the battery 11. Thus, according to the present embodiment, the server 3 can distinctly separate and appropriately manage vehicles that are permitted to enter and travel in the green zone and those that are not.

Note that FIGS. 8 and 9 have been described with reference to the server 3 performing all the steps. However, the steps may be performed by the ECU 13 of the vehicle 1. Alternatively, the steps may be divided between the server 3 and the ECU 13. In other words, the server 3 may perform some of the steps and the ECU 13 may perform the rest.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A server for managing electric power information of a vehicle, wherein
    the vehicle includes a power storage device that is charged
        with electric power supplied from a charging facility, the server comprising:
- an interface that obtains an emission intensity of greenhouse gas of electric power supplied from the charging facility; and
- a processor that associates an amount of electric power charged from the charging facility to the power storage device with the emission intensity obtained via the interface, wherein the processor:
- determines, based on an amount of electric power having the emission intensity less than a regulatory limit within an amount of electric power stored in the power storage device, whether to permit the vehicle to travel within a travel restriction zone in which traveling using an amount of electric power having the emission intensity greater than the regulatory limit is restricted; and
- notifies a user of the vehicle of a determination result.

2. The server according to claim 1, wherein the processor:
- notifies the user of the vehicle as being permitted to travel in the travel restriction zone, when the amount of electric power having the emission intensity less than the regulatory limit is greater than a reference amount; and
- notifies the user of the vehicle as being not permitted to travel in the travel restriction zone, when the amount of electric power having the emission intensity less than the regulatory limit is less than the reference amount.

3. The server according to claim 1, wherein
prior to the vehicle entering the travel restriction zone, the processor notifies the user of the determination result.

4. A power management system, comprising:
the server according to claim 1; and
the vehicle, wherein
the vehicle includes a display, and
the display shows the determination result in a manner viewable from inside the vehicle.

5. The power management system according to claim 4, wherein
the display further shows at least one of the amount of electric power having the emission intensity less than the regulatory limit and a distance that the vehicle is allowed to travel using the amount of electric power.

6. A power management system, comprising:
the server according to claim 1; and
the vehicle, wherein
the vehicle includes a display, and
the display shows the determination result in a manner viewable from outside the vehicle.

7. The power management system according to claim 4, further comprising
a gate disposed at a boundary of the travel restriction zone, wherein
as the vehicle approaches the gate, the gate opens or closes depending on the amount of electric power having the emission intensity less than the regulatory limit.

8. A method for managing electric power information of a vehicle, wherein
the vehicle includes a power storage device that is charged with electric power supplied from a charging facility,
the method comprising:
- obtaining the amount of electric power charged from the charging facility to the power storage device,
- obtaining an emission intensity of greenhouse gas of the electric power supplied from the charging facility;
- associating the amount of electric power charged from the charging facility to the power storage device with the emission intensity;
- determining, based on an amount of electric power having the emission intensity less than a regulatory limit within an amount of electric power stored in the power storage device, whether to permit the vehicle to travel within a travel restriction zone in which traveling using an amount of electric power having the emission intensity greater than the regulatory limit is restricted; and
- notifying a user of the vehicle of a determination result.

* * * * *